(12) United States Patent
Zou et al.

(10) Patent No.: US 12,326,514 B2
(45) Date of Patent: Jun. 10, 2025

(54) INTEGRATED PHOTONICS MILLIMETER WAVE (MMW) RADAR COMMUNICATION SYSTEM BASED ON ANALOG PHASE MODULATION SCHEME

(71) Applicant: Southwest Jiaotong University, Chengdu (CN)

(72) Inventors: Xihua Zou, Chengdu (CN); Peixuan Li, Chengdu (CN); Wenlin Bai, Chengdu (CN); Jia Ye, Chengdu (CN); Lianshan Yan, Chengdu (CN); Wei Pan, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 446 days.

(21) Appl. No.: 17/993,918

(22) Filed: Nov. 24, 2022

(65) Prior Publication Data

US 2023/0324504 A1    Oct. 12, 2023

(30) Foreign Application Priority Data

Apr. 8, 2022    (CN) .......................... 202210363864.4

(51) Int. Cl.
*G01S 7/00*     (2006.01)
*H04B 1/04*     (2006.01)
(Continued)

(52) U.S. Cl.
CPC ............... *G01S 7/003* (2013.01); *H04B 1/04* (2013.01); *H04B 1/16* (2013.01); *H04L 27/20* (2013.01)

(58) Field of Classification Search
CPC .. G01S 7/003; H04B 1/04; H04B 1/16; H04L 27/20
See application file for complete search history.

(56) References Cited

U.S. PATENT DOCUMENTS

| 3,824,597 A * | 7/1974 | Berg ...................... H04B 10/11 370/215 |
| 2008/0218429 A1* | 9/2008 | Johnson ................... H03D 7/00 343/893 |

(Continued)

OTHER PUBLICATIONS

Suzanne Melo, et al., Dual-use System Combining Simultaneous Active Radar & Communication, Based on a Single Photonics-Assisted Transceiver, International Radar Symposium (IRS), 2016.

(Continued)

*Primary Examiner* — Vladimir Magloire
*Assistant Examiner* — Peter Davon Doze
(74) *Attorney, Agent, or Firm* — Bayramoglu Law Offices LLC

(57) ABSTRACT

An integrated photonics millimeter wave (MMW) radar communication system based on analog phase modulation scheme includes an integrated photonics MMW radar communication signal transmitter, a radar receiver, and a communication receiver. The transmitter includes a radar communication signal analog phase modulation module, an optical frequency comb (OFC) module, an electro-optic modulator (EOM), an optical shaping filter, an optical power divider, a photoelectric detector, an electric power amplifier, and a transmitting antenna that are cascaded sequentially. The radar receiver includes a radar receiving antenna, an electric low-noise amplifier (LNA), an optical phase modulator, an optical bandpass filter (BPF), a low-speed photoelectric detector, an electric low-pass filter, and a low-speed oscilloscope that are cascaded sequentially. In the communication receiver, a communication receiving antenna is sequentially cascaded with an electric LNA, a frequency mixer, and an oscilloscope, and a voltage-controlled oscillator is cascaded with a frequency multiplier and then connected to the frequency mixer.

5 Claims, 2 Drawing Sheets

(51) Int. Cl.
H04B 1/16 (2006.01)
H04L 27/20 (2006.01)

(56) References Cited

U.S. PATENT DOCUMENTS

2010/0278538 A1* 11/2010 Guidotti ................. H04B 10/90
398/115
2013/0044311 A1* 2/2013 Rakuljic ................. G01S 17/34
356/5.09
2021/0018814 A1* 1/2021 Gowda ................... H04J 14/08
2021/0336698 A1* 10/2021 Yang ................. H04L 12/40104

OTHER PUBLICATIONS

Haijiang Nie, et al., Photonics-based integrated communication and radar system, Microwave Photonics (MWP), 2019.

* cited by examiner

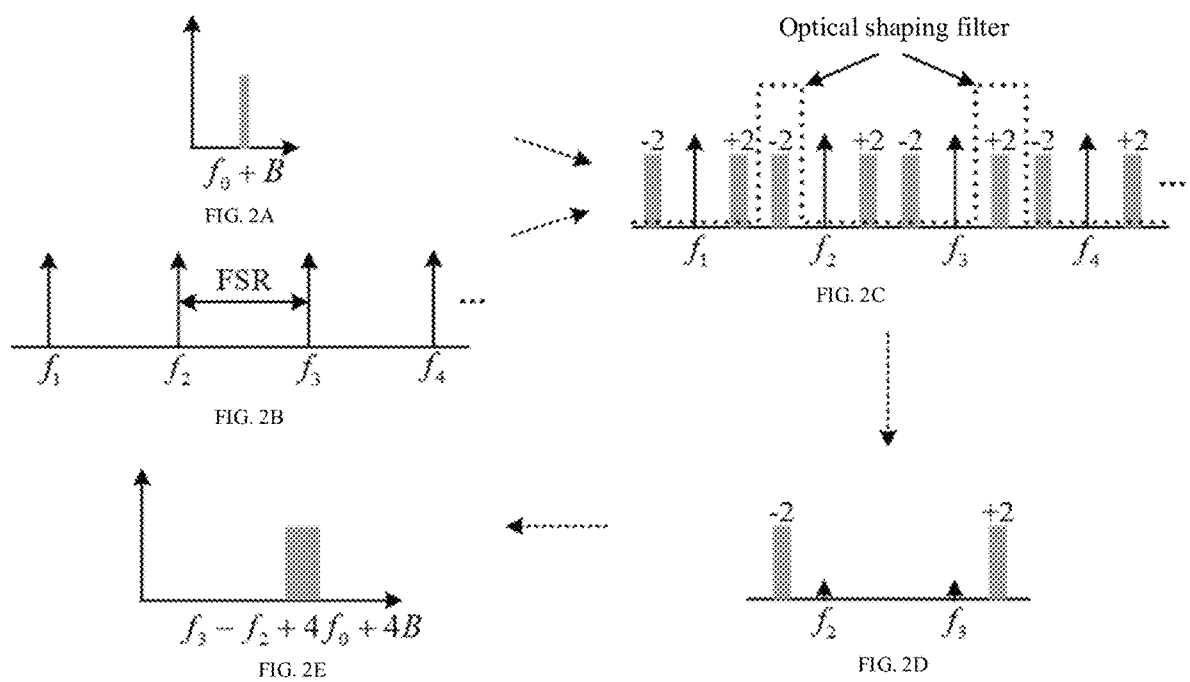

INTEGRATED PHOTONICS MILLIMETER WAVE (MMW) RADAR COMMUNICATION SYSTEM BASED ON ANALOG PHASE MODULATION SCHEME

CROSS REFERENCE TO THE RELATED APPLICATIONS

This application is based upon and claims priority to Chinese Patent Application No. 202210363864.4, filed on Apr. 8, 2022, the entire contents of which are incorporated herein by reference.

TECHNICAL FIELD

The present invention relates to an integrated photonics radar communication technology with microwave (MW)/millimeter wave (MMW) and large bandwidth, particularly to an integrated photonics MMW radar communication system based on analog phase modulation scheme.

BACKGROUND

Next-generation wireless networks (i.e. 6G and beyond) have been predicted to be the key driving factor of many emerging applications, including smart cities and smart industries, the Internet of Everything (IoE), and virtual worlds. These applications and scenarios require sufficient spectrum bandwidth to achieve both high-throughput communication data transmission and high-resolution radar sensing capability. However, the scarce spectrum resources and limited hardware space will cause serious conflict and competition between discrete communication systems and radar systems. In recent years, integrated radar communication technology has realized the functions of radar sensing and communication transmission on a single platform with the advantage of spectrum sharing, which is regarded as a potential candidate solution for future wireless communication networks.

At present, the research of radar communication integration can be divided into two categories: the research on signal multiplexing method and the research on signal sharing mechanism. The former achieves dual functions through the methods for multiplexing the time domain, frequency domain, and space domain, but these methods still cannot make full use of the hardware and spectrum resources of the system. The latter completes radar detection and signal transmission simultaneously by generating integrated waveforms, which is an efficient and practical integration solution. However, due to the limitation of electronic devices, the bandwidth of integrated signals traditionally generated by the electrical domain method is limited to the magnitude of GHz, and the improvement in radar range resolution and communication rate is very limited.

MW/MMW photonics has obvious advantages such as high working frequency, large instantaneous bandwidth (IBW), and strong anti-electromagnetic interference capability, so it has been widely used in high-resolution radar imaging, high-speed optical wireless communication, and other fields. However, currently, there is little research on the integration of photonics radar communication, and the research mainly focuses on the dual-band dual-function integrated system ("Dual-use system combining simultaneous active radar & communication, based on a single photonics-assisted transceiver," in *International Radar Symposium* (*IRS*), Krakow, Poland, 2016, pp. 1-4.) and the generation of the amplitude modulation (AM) and linear frequency modulated (LFM) signal of cascade modulators ("Photonics-based integrated communication and radar system," in *Microwave Photonics* (*MWP*), Ottawa, Canada, 2019, pp. 1-4.). These methods still have some defects, such as low spectrum efficiency, the mutual restriction between radar and communication functions, and the like.

SUMMARY

An objective of the present invention is to provide an integrated photonics MMW radar communication system based on analog phase modulation scheme, which has the characteristics of wide broadband and the dual function of co-time and co-frequency.

The objective of the present invention is achieved by the following technical solutions. An integrated photonics MMW radar communication system based on analog phase modulation scheme includes an integrated photonics MMW radar communication signal transmitter, a radar receiver, and a communication receiver. The integrated photonics MMW radar communication signal transmitter includes a radar communication signal analog phase modulation module, an optical frequency comb (OFC) module, an electro-optic modulator (EOM), an optical shaping filter, an optical power divider, a photoelectric detector, an electric power amplifier, and a transmitting antenna that are cascaded sequentially. The radar receiver includes a radar receiving antenna, an electric low-noise amplifier (LNA), an optical phase modulator, an optical bandpass filter (BPF), a low-speed photoelectric detector, an electric low-pass filter, and a low-speed oscilloscope that are cascaded sequentially. In the communication receiver, a communication receiving antenna is sequentially cascaded with an electric LNA, a frequency mixer, and an oscilloscope, and a voltage-controlled oscillator is cascaded with a frequency multiplier and then connected to the frequency mixer.

In the integrated photonics MMW radar communication signal transmitter, the OFC module generates OFC signals with a frequency interval of $\Delta f$ and injects the OFC signals into the EOM. The radar communication signal analog phase modulation module generates an integrated intermediate frequency (IF) signal with a center frequency of $f_0$ and a bandwidth of B, and the signal drives the EOM and the EOM is biased at a maximum transmission point by controlling a bias voltage and thus even-order sideband OFC signals are generated. Under a small signal modulation, the power of high-order ($\geq 4$) optical sideband signals is very weak, and only a carrier and $\pm 2$-order sideband optical signals exist. The optical shaping filter filters out other useless optical signals, leaving only $-2$-order sideband and $+2$-order sideband of adjacent two optical combs. The optical power divider divides the optical signals into two parts according to a ratio of 50:50: one part is configured as a reference optical carrier signal to be input into the optical phase modulator of the radar receiver, and the other part is injected into the photoelectric detector. An integrated MMW radar communication signal with a center frequency of $f_3-f_2+4f_0$ and a bandwidth of 4B is generated by photonic heterodyne beat frequency. The integrated radar communication signal is power-amplified by the electric power amplifier and radiated to a free space by the transmitting antenna.

In the radar receiver, the receiving antenna acquires a radar echo signal reflected by a moving target object. After passing through the electric LNA, the radar echo signal is input into the optical phase modulator, and the optical phase modulator modulates the radar echo signal on the reference optical carrier signal. The optical BPF only selects two kinds of coincident optical signals (the reference optical signal and the radar echo modulated optical signal) in the −2-order or +2-order sideband region, and a photonic de-chirping processing is completed by the low-speed photoelectric detector to obtain position information of the moving target object. Then, the electric low-pass filter is connected to the low-speed oscilloscope to complete a signal acquisition and achieve high-resolution imaging of the moving target object by using an inverse synthetic aperture radar (ISAR) algorithm.

In the communication receiver, the communication receiving antenna receives the integrated MMW radar communication signal transmitted wirelessly, and a signal power compensation is performed by using the electric LNA. The voltage-controlled oscillator is combined with the frequency multiplier to generate a radar signal corresponding to the center frequency and the bandwidth of the integrated MMW radar communication signal. The received integrated MMW radar communication signal and the radar signal are frequency-mixed by the frequency mixer to be IF. By using a coherent reception demodulation algorithm, a radar signal carrier is removed and an analog communication signal is recovered. The obtained communication data is displayed by the oscilloscope.

A radar signal in the radar communication signal analog phase modulation module is a linear frequency modulated continuous wave (LFMCW) signal to achieve high-resolution imaging, and the communication signal is an IF high-order modulated orthogonal frequency division multiplexing (OFDM) system signal to realize high-speed communication. The communication signal is modulated on a phase of the radar signal by an analog phase modulation method to generate the integrated radar communication signal. The integrated radar communication signal is transmitted with high spectrum efficiency and high signal-to-noise ratio (SNR) by adjusting a phase modulation factor of the integrated radar communication signal.

The OFC module tunes the center frequency of the generated integrated MMW radar communication signal by controlling a free spectrum range (FSR) of OFC.

The ISAR algorithm and the coherent reception demodulation algorithm are both known algorithms.

In the integrated photonics MMW radar communication system based on analog phase modulation scheme, according to the frequency multiplying mechanism of the proposed integrated photonics MMW radar communication signal transmitter, the bandwidth of the generated integrated MMW radar communication signal is expanded by 4 times, a radar resolution is increased by 4 times, and a communication SNR is improved by 12 dB.

In the present invention, the integrated photonics MMW radar communication signal transmitter includes the radar communication signal analog phase modulation module, the OFC module, the EOM, the optical shaping filter, the optical power divider, the photoelectric detector, the electric power amplifier, and the transmitting antenna. The optical power divider is divided into two parts: one part is configured for the photoelectric detector injected to generate the integrated signal, and the other part is configured for the radar receiver to receive the reference optical carrier. A photonics radar receiver includes the radar receiving antenna, the electric LNA, the optical phase modulator, the optical BPF, the low-speed photoelectric detector, the electric low-pass filter, and the oscilloscope. The communication receiver includes the communication receiving antenna, the electric LNA, the frequency mixer, the voltage-controlled oscillator, the frequency multiplier, and the oscilloscope.

In the integrated photonics MMW radar communication transmitter of the present invention, the OFC signals are injected into the modulation spindle of the EOM, and the integrated signal generated by the radar communication signal module modulates the OFC signal. Under the small signal modulation, the bias voltage is controlled to make the EOM produce only the carrier and 2-order sideband optical signals. The optical shaping filter completes the optical wavelength selection operation, leaving only the −2-order sideband and +2-order sideband of the adjacent two optical combs. The optical power divider divides the optical signals into two parts according to the ratio of 50:50: one part is configured as the de-chirped reference optical carrier of the radar receiver, and the other part is connected to the photoelectric detector to generate the integrated MMW signal. The center frequency of the MMW signal is tuned by controlling the FSR of the OFC. Then, the integrated MMW signal is radiated by the electric power amplifier and the transmitting antenna for radar detection and communication transmission. The radar receiver acquires the echo signal reflected by the moving target object through the radar receiving antenna, and the echo signal is modulated to the reference optical carrier by the electric LNA and the optical phase modulator. The frequency information with the position of the target object is obtained by completing the radar de-chirping processing using the optical BPF and the low-speed photoelectric detector, and the signal acquisition is completed by accessing the oscilloscope through the low-pass filter. Combined with the ISAR imaging algorithm, the high-resolution imaging of the moving target object is achieved. The communication receiver acquires the integrated MMW signal through the receiving antenna, inputs the integrated MMW signal into the frequency mixer through the LNA, converts the integrated MMW signal down to the IF, and finally obtains the communication information based on the coherent demodulation method.

Compared with the prior art, the present invention has the following characteristics and advantages:

(1) A large-capacity high-order modulated communication signal (such as OFDM) is modulated on a large-bandwidth radar signal (such as an LFM signal) by analog phase modulation to generate an integrated signal with a constant envelope. Then, the integrated MMW signal with 4-fold frequency is obtained by using photon frequency multiplying technology, and high-resolution radar detection and high-speed communication transmission are realized at the co-time and co-frequency.

(2) The constant envelope characteristic of the integrated signal reduces the communication signal distortion caused by the radar power amplifier and improves the anti-noise capability and reliability of the integrated system.

(3) The center frequency of the generated integrated signal is tuned by adjusting the FSR of the OFC, which can generate the integrated signal with a higher frequency and larger bandwidth to be more easily extended to the radar communication integration in the terahertz-level frequency band.

BRIEF DESCRIPTION OF THE DRAWINGS

FIGS. 2A-2E are schematic diagrams showing the frequency spectrum evolution process of the generation of an integrated MMW signal in the integrated photonics MMW radar communication signal transmitter.

DETAILED DESCRIPTION OF THE EMBODIMENTS

Figure 1:
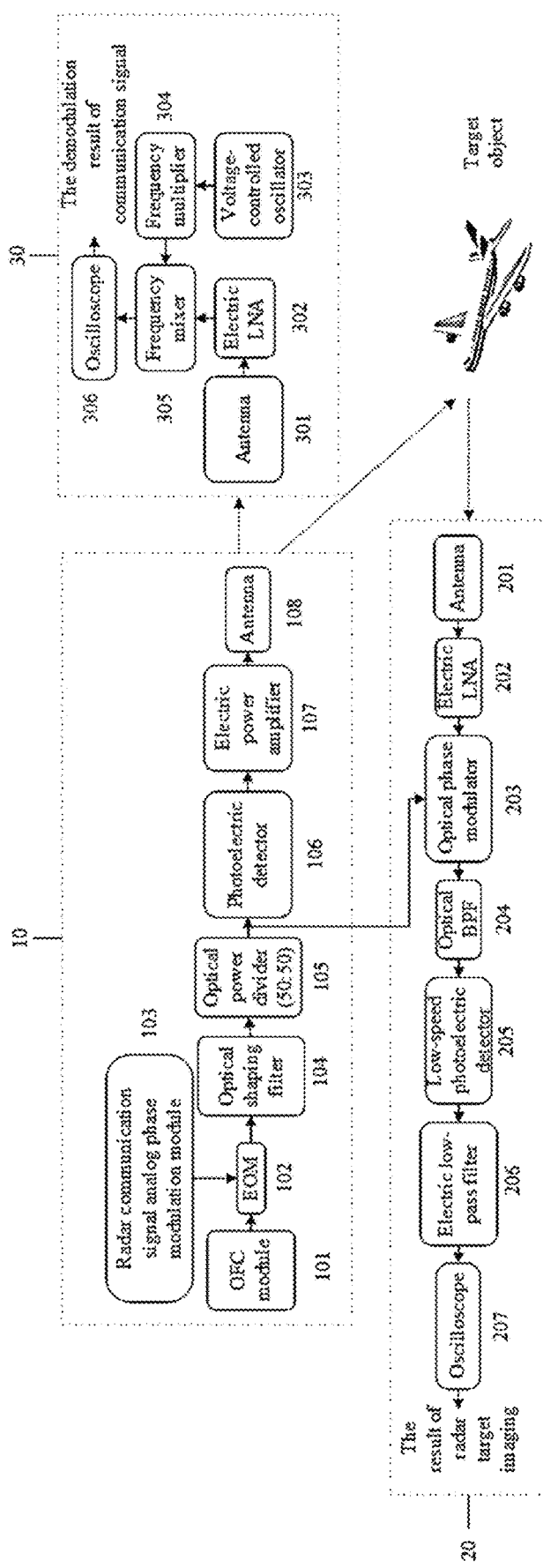
FIG. 1 is a block diagram showing the principle of a system according to the present invention.

As follows, the implementation of the present invention is further described in conjunction with the drawings.

As shown in FIG. 1, an integrated photonics MMW radar communication system based on analog phase modulation scheme includes three parts: the integrated photonics MMW radar communication signal transmitter 10, the radar receiver 20, and the communication receiver 30. In the integrated photonics MMW radar communication signal transmitter 10, the OFC module 101 generates OFC signals (as shown in FIG. 2B) with a frequency interval of $\Delta f$ and injects the OFC signals into the EOM 102. The radar communication signal analog phase modulation module 103 generates an integrated IF signal (as shown in FIG. 2A) with a center frequency of $f_0$ and a bandwidth of B, and the signal drives the EOM 102 and the EOM is biased at the maximum transmission point by controlling the bias voltage and thus even-order sideband OFC signals are generated. Under small signal modulation, the power of the high-order (4) optical sideband signals is very weak, and there are only carrier and ±2-order sideband optical signals, as shown in FIG. 2C. The wavelength selection function (such as the dotted line in FIG. 2C) of the optical shaping filter 104 is used to filter out other useless optical signals, leaving only the −2-order sideband and +2-order sideband of the adjacent two optical combs, as shown in FIG. 2D. Subsequently, the optical power divider 105 divides the optical signals into two parts according to the ratio of 50:50: one part is configured as a de-chirped reference optical carrier signal of the radar receiver 20, and the other part is injected into the photoelectric detector 106. An integrated MMW signal (as shown in FIG. 2E) with a center frequency of $f_3-f_2+4f_0$ and a bandwidth of 4B is generated by photonic heterodyne beat frequency. Then, the integrated MMW signal is power-amplified by the electric power amplifier 107 and radiated to the free space by the transmitting antenna 108 to complete the radar detection and communication transmission.

In the radar receiver 20, the receiving antenna 201 acquires the radar echo signal reflected by a moving target object. After passing through the electric LNA 202, the radar echo signal is input into the optical phase modulator 203 to modulate the reference optical carrier signal. According to the photon frequency multiplying principle, both the radar echo signal and the reference signal are in the same sideband, that is −2-order sideband or +2-order sideband. By using the optical BPF 204, only two kinds of coincident optical signals in the −2-order or +2-order sideband region are selected, and the photonic de-chirping processing is completed by the low-speed photoelectric detector 205 to obtain the position information of the moving target object. Then, the electric low-pass filter 206 is connected to the low-speed oscilloscope 207 to complete a signal acquisition and combined with ISAR digital imaging algorithm to achieve high-resolution imaging of the moving target object.

In the communication receiver 30, the communication receiving antenna 301 receives the integrated signal transmitted wirelessly, and the signal power compensation is performed by using the electric LNA 302. The voltage-controlled oscillator 303 is combined with the frequency multiplier 304 to generate a radar signal corresponding to the center frequency and the bandwidth of the integrated MMW signal. Then, the received integrated signal and the radar signal are frequency-mixed by the frequency mixer 305 to be IF, removing the radar signal carrier and recovering the communication signal. By using the coherent reception demodulation algorithm, the communication data is obtained.

The above only describes a preferred embodiment of the present invention, and it should be noted that without departing from the essence of the method and the core device of the present invention, a plurality of modifications and improvements may be made in the actual implementation and should also be included in the scope of protection of the present invention.

What is claimed is:

1. An integrated photonics millimeter wave (MMW) radar communication system based on an analog phase modulation scheme, comprising an integrated photonics MMW radar communication signal transmitter, a radar receiver, and a communication receiver;

the integrated photonics MMW radar communication signal transmitter comprises a radar communication signal analog phase modulation module, an optical frequency comb (OFC) module, an electro-optic modulator (EOM), an optical shaping filter, an optical power divider, a photoelectric detector, an electric power amplifier, and a transmitting antenna, wherein the radar communication signal analog phase modulation module, the OFC module, the EOM, the optical shaping filter, the optical power divider, the photoelectric detector, the electric power amplifier, and the transmitting antenna are cascaded sequentially;

the radar receiver comprises a radar receiving antenna, a first electric low-noise amplifier (LNA), an optical phase modulator, an optical bandpass filter (BPF), a low-speed photoelectric detector, an electric low-pass filter and a low-speed oscilloscope, wherein the radar receiving antenna, the first electric LNA, the optical phase modulator, the optical BPF, the low-speed photoelectric detector, the electric low-pass filter and the low-speed oscilloscope are cascaded sequentially;

in the communication receiver, a communication receiving antenna is sequentially cascaded with a second electric LNA, a frequency mixer, and an oscilloscope, and a voltage-controlled oscillator is cascaded with a frequency multiplier and then connected to the frequency mixer.

2. The integrated photonics MMW radar communication system according to claim 1, wherein in the integrated photonics MMW radar communication signal transmitter, the OFC module generates OFC signals with a frequency interval of $\Delta f$ and the OFC module injects the OFC signals into the EOM; the radar communication signal analog phase modulation module generates an integrated intermediate frequency (IF) signal with a center frequency of $f_o$ and a bandwidth of B, and the integrated IF signal drives the EOM and the EOM is biased at a maximum transmission point by controlling a bias voltage and thus even-order sideband OFC signals are generated; under a small signal modulation, a power of high-order (≥4) optical sideband signals is very weak, and only a carrier and ±2-order sideband optical signals exist; the optical shaping filter filters out other useless optical signals, leaving only −2-order sideband and +2-order sideband of adjacent two optical combs; the optical power divider divides the optical signals into two parts according to a ratio of 50:50, wherein a first part is configured as a reference optical carrier signal to be input into the optical phase modulator of the radar receiver, and a second part is injected into the photoelectric detector; an integrated MMW radar communication signal with a center frequency of $f_3$-$f_2$+4$f_o$ and a bandwidth of 4B is generated by a photonic heterodyne beat frequency; the integrated MMW radar communication signal is power-amplified by the electric power amplifier and radiated to a free space by the transmitting antenna; in the radar receiver, the receiving antenna acquires a radar echo signal reflected by a moving target object; after passing through the first electric LNA, the radar echo signal is input into the optical phase modulator, and the optical phase modulator modulates the radar echo signal on the reference optical carrier signal; the optical BPF only selects two kinds of coincident optical signals in −2-order or +2-order sideband region, and a photonic de-chirping processing is completed by the low-speed photoelectric detector to obtain position information of the moving target object; then the electric low-pass filter is connected to the low-speed oscilloscope to complete a signal acquisition and achieve an image of the moving target object; in the communication receiver, the communication receiving antenna receives the integrated MMW radar communication signal transmitted wirelessly, and a signal power compensation is performed by using the second electric LNA; the voltage-controlled oscillator is combined with the frequency multiplier to generate a radar signal corresponding to the center frequency and the bandwidth of the integrated MMW radar communication signal; the integrated MMW radar communication signal and the radar signal are frequency-mixed by the frequency mixer to be IF, where a radar signal carrier is removed and an analog communication signal is recovered.

3. The integrated photonics MMW radar communication system according to claim 1, wherein a radar signal in the radar communication signal analog phase modulation module is a linear frequency modulated continuous wave (LFMCW) signal to achieve imaging, and the communication signal is an IF high-order modulated orthogonal frequency division multiplexing (OFDM) system signal to realize a communication; the communication signal is modulated on a phase of the radar signal by an analog phase modulation method to generate the integrated MMW radar communication signal; the integrated MMW radar communication signal is transmitted with spectrum efficiency and a signal-to-noise ratio (SNR) by adjusting a phase modulation factor of the integrated MMW radar communication signal.

4. The integrated photonics MMW radar communication system according to claim 1, wherein the OFC module tunes the center frequency of the integrated MMW radar communication signal by controlling a free spectrum range (FSR) of OFC.

5. The integrated photonics MMW radar communication system according to claim 1, wherein according to a frequency multiplying mechanism of the integrated photonics MMW radar communication signal transmitter, the bandwidth of the integrated MMW radar communication signal is expanded by 4 times, a radar resolution is increased by 4 times, and a communication SNR is improved by 12 dB.

* * * * *